(12) United States Patent
Lea-Wilson et al.

(10) Patent No.: US 8,997,849 B2
(45) Date of Patent: Apr. 7, 2015

(54) ISOLATED SHEARING MECHANISM FOR DOWNHOLE TOOLS

(75) Inventors: Mark A. Lea-Wilson, Edmonton (CA); Shane McAssey, Ardrossan (CA)

(73) Assignee: Plainsman Manufacturing Inc., Edmonton (CA)

( * ) Notice: Subject to any disclaimer, the term of this patent is extended or adjusted under 35 U.S.C. 154(b) by 501 days.

(21) Appl. No.: 13/305,709

(22) Filed: Nov. 28, 2011

(65) Prior Publication Data
US 2013/0032326 A1    Feb. 7, 2013

Related U.S. Application Data

(60) Provisional application No. 61/514,350, filed on Aug. 2, 2011.

(51) Int. Cl.
*E21B 17/06*    (2006.01)
*F16D 9/04*    (2006.01)

(52) U.S. Cl.
CPC ...................... *E21B 17/06* (2013.01)

(58) Field of Classification Search
CPC ....... E21B 43/126; E21B 37/10; E21B 19/16; E21B 17/06
USPC ........ 166/105, 68; 464/32, 30, 179, 182, 905; 403/2
See application file for complete search history.

(56) References Cited

U.S. PATENT DOCUMENTS

| | | | |
|---|---|---|---|
| 2,161,501 A * | 6/1939 | Blackmon | 403/328 |
| 2,876,993 A * | 3/1959 | Hooks | 175/301 |
| 2,916,092 A | 12/1959 | Burns | |
| 3,168,873 A * | 2/1965 | Huckaby | 417/434 |
| 3,809,162 A * | 5/1974 | Sydor | 166/377 |
| 3,902,743 A | 9/1975 | Martin | |
| 3,934,652 A | 1/1976 | Cochran | |
| 3,963,074 A | 6/1976 | Spriggs | |
| 4,184,345 A * | 1/1980 | Cutler | 464/32 |
| 4,221,549 A * | 9/1980 | Rizzone et al. | 417/437 |

(Continued)

FOREIGN PATENT DOCUMENTS

| | | |
|---|---|---|
| CA | 1 188 217 A | 6/1985 |
| CA | 2 041 049 C | 12/1991 |

(Continued)

OTHER PUBLICATIONS

Australian Examination Report mailed Dec. 4, 2014, issued in corresponding Australian Application No. AU 201211376, filed Jul. 31, 2012, 7 pages.

*Primary Examiner* — Kenneth L Thompson
(74) *Attorney, Agent, or Firm* — Christensen O'Connor Johnson Kindness PLLC

(57) ABSTRACT

A shearing mechanism in which a male component mates into a female component, the male component having a first groove extending around the male component and the female component having a second groove extending around the female component, the first groove and the second groove cooperating when the male component is inserted into the female component to define an annular recess. A shearing component is provided within the annular recess, the shearing component having a shear load that is controlled by the material and size of the shearing component. An opening is provided within one or both of the male component and female component, the opening being aligned with the annular recess. Stress relief is provided.

7 Claims, 5 Drawing Sheets

(56) References Cited

U.S. PATENT DOCUMENTS

| | | | |
|---|---|---|---|
| 4,373,752 A | 2/1983 | Nelson | |
| 4,422,508 A * | 12/1983 | Rutledge et al. | 166/376 |
| 4,577,686 A | 3/1986 | Milberger | |
| 4,926,936 A | 5/1990 | Braddick | |
| 5,327,972 A | 7/1994 | Theiss | |
| 6,161,667 A | 12/2000 | Chludek | |
| 6,186,697 B1 * | 2/2001 | Masuda et al. | 403/359.5 |
| 6,691,776 B2 | 2/2004 | Guillory | |
| 6,875,145 B2 | 4/2005 | McKay | |
| 6,883,604 B2 * | 4/2005 | Mack et al. | 166/105 |
| 7,128,147 B2 | 10/2006 | Marcin | |
| 7,980,307 B2 | 7/2011 | Saylor, III | |
| 2002/0175519 A1 | 11/2002 | Mack | |
| 2004/0202521 A1 | 10/2004 | Bostik | |
| 2010/0164223 A1 | 7/2010 | Curtiss, III | |
| 2011/0150596 A1 * | 6/2011 | Wolodko et al. | 411/5 |

FOREIGN PATENT DOCUMENTS

| | | |
|---|---|---|
| CA | 2 065 680 A1 | 11/1992 |
| CA | 2 688 801 A1 | 6/2011 |
| GB | 792886 A | 4/1958 |
| WO | 03/058027 A1 | 6/2003 |
| WO | 2009/042460 A2 | 4/2009 |

\* cited by examiner

ISOLATED SHEARING MECHANISM FOR DOWNHOLE TOOLS

BACKGROUND

The disclosed devices relate to sucker rod components, tubing drains and downhole tooling, assuring that components will detach at an applied pre-determined tensile load or pressure while eliminating the effects of torsion and bending on the shearing mechanism.

In a producing oil or gas well a rotating downhole pump is driven from the surface by a sucker rod string. The pump typically consists of a rotor which is attached to the sucker rod string and spins inside a stator. Sometimes it is necessary to remove the sucker rod string from the rotor. The shear coupling is threaded onto the sucker rod string near the pump and when a pre-determined axial load is applied to the shear coupling it separates allowing the sucker rod string to be removed.

Similar to sucker rod strings tubing string are formed of segments of tubing. The sucker rod and pump lie within the tubing string. Tubing drains thread between segments of tubing near the bottom of the string. The tubing drain is activated prior to removing the tubing from the well and is necessary to avoid lifting the weight of the fluid column and to avoid fluid contamination of the surface at the well site.

Presently most shear couplings are comprised of two components, one male component which mates with a female component, and a number of shear pins inserted into holes drilled transversely through both components of the shear coupling [U.S. Pat. No. 4,422,508]. Alternatively some shear couplings are comprised of single or multiple components with a reduced cross sectional area designed to shear when a pre-determined tensile load is applied [U.S. Pat. No. 2004/0202521 A1, U.S. Pat. No. 5,470,118]. Known shear mechanisms in shear couplings at this time are subject to combined axial, bending and torsion loading experienced in typical downhole production, and the bending and torsional loading is much greater in deviated wells than vertical wells because of well deviation and friction along the tubing string. The combined stress from axial, bending and torsion loading may result in early activation of the shear mechanism below the designed pre-determined axial load disrupting production. Additionally the bending and torsion loading fatigues the shear mechanism leading to early failure and disrupting production. Even designs utilizing keyways and shear pins are subject to torsional and bending loads at the pins. Not all circumferential displacement is taken up by the key and this displacement travels down through the male component of the shear coupling and is then transferred to the shear pins.

In a typical shear coupling comprising one male component, one female component, and multiple shear pins, the pins fit tightly or are press fit into the transverse thru holes and typically the key and keyway have a looser fit than the pins. The pins are typically aligned in a single plane through the axis of the shear coupling. If the shear coupling is bent downhole, this one plane is significantly stiffer than the rest of the shear coupling. When the shear coupling rotates, the uneven stiffness of the shear coupling exposes the shear coupling to undesirable loading conditions which lead to fatigue damage. As torque is applied to this type of shear coupling, the pins are subject to shear loads before the keyway experiences torsional loading because it takes less circumferential displacement for the pins to be loaded than the keyway. Additionally, a typical keyway has a small bearing area where the male and female halves of the keyway make contact. As the bearing area deforms additional torsion is applied to the pins. The combined tensile loading from string weight, torsion and bending loads can cause fatigue at the pins and keyway and may lead to premature activation of the shear mechanism. Accidental activation of the shear mechanism is costly at producing well sites.

SUMMARY

A shearing mechanism or shear coupling is provided for securing two components which shears at a pre-determined axial load.

In one embodiment, a male component mates into a female component, the male component having a first groove extending around the male component and the female component having a second groove extending around the female component, the first groove and the second groove cooperating when the male component is inserted into the female component to define an annular recess. A shearing component is provided within the annular recess, the shearing component having a shear load that is controlled by the material and size of the shearing component. An opening is provided within one or both of the male component and female component, the opening being aligned with the annular recess.

In another embodiment, a male component mated with a female component have cooperating receiving parts that together define a receiving space extending around the male component; and a breakable part is located in the receiving space, the breakable part contacting against each of the male component and the female component to convey axial forces between the male component and the female component below a first axial load and the breakable part being breakable under axial loads within an operating range of axial loads below the axial load break points of the male component and female component and above the first axial load, and the operating range corresponding to a pre-set range for breaking the shear coupling.

In another embodiment, a male component mated with a female component have cooperating receiving parts that together define one or more receiving spaces; one or more breakable parts are located in the one or more receiving spaces, the one or more breakable parts contacting against each of the male component and the female component to convey axial forces between the male component and the female component below a first axial load and the breakable part being breakable under axial loads within an operating range of axial loads below the axial load break points of the male component and female component and above the first axial load, and the operating range corresponding to a pre-set range for breaking the shear coupling. The male component has a connecting end that connects to a part in a well string other than the female component and has an end that bears against the female component. The male component has a reduced diameter part between the connecting end and the end that bears against the female component to provide stress relief on the breakable part in operation of the shear coupling. The reduced diameter part may be provided between the connecting end and the receiving space.

In other embodiments, the shearing component or one or more breakable parts comprise a wire or strip; the male component is keyed to the female component; the receiving space comprises an annular groove; an opening in one or both of the male component and the female component that is aligned with the receiving space. The shearing mechanism may be incorporated in a tubing drain.

BRIEF DESCRIPTION OF THE DRAWINGS

There will now be described embodiments with regard to the figures by way of example.

DETAILED DESCRIPTION

Figure 1:
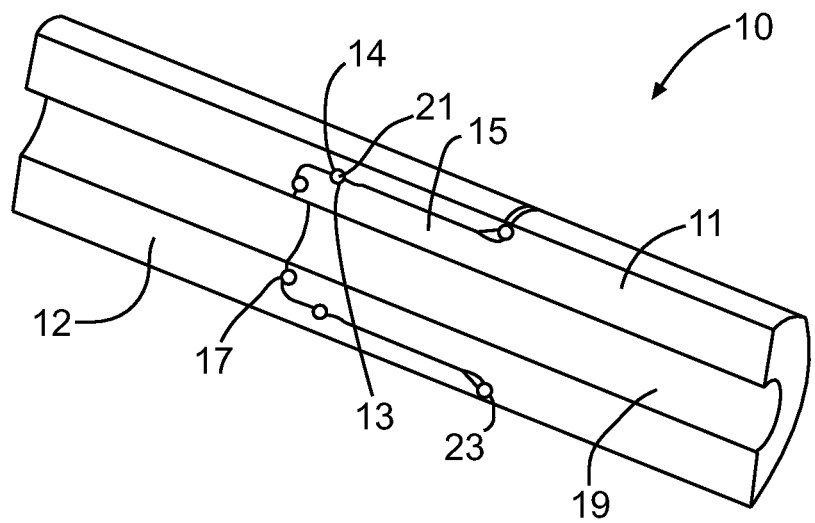
FIG. 1 is an isometric view sectioned through the axis of the preferred embodiment of the shear mechanism in an assembled shear coupling. Wire not shown; removed for clarity. The shear mechanism is isolated from torsion.
Figure 2:
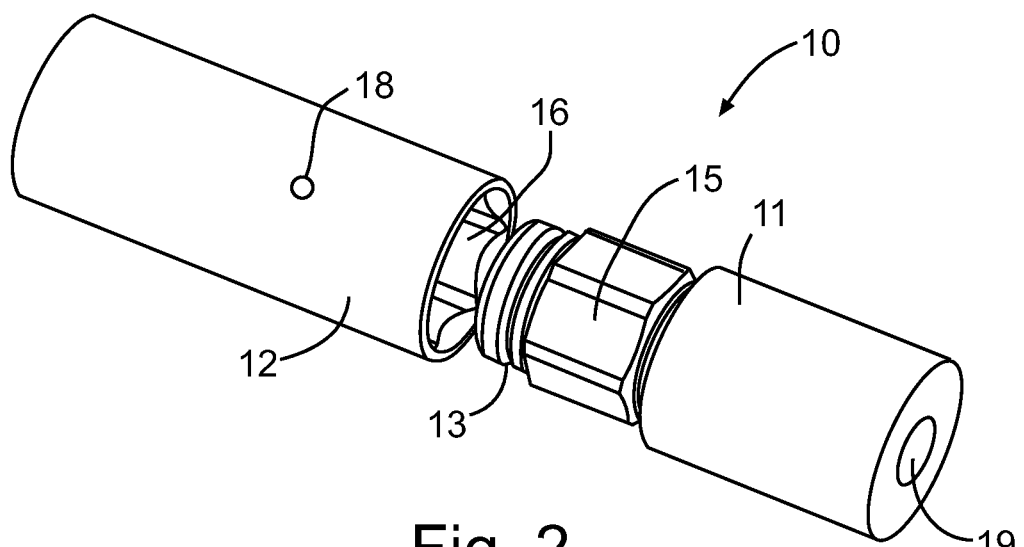
FIG. 2 is an exploded isometric view of the preferred embodiment of the shear mechanism in a shear coupling. Wire not shown; removed for clarity. The shear mechanism is isolated from torsion.
Figure 3:
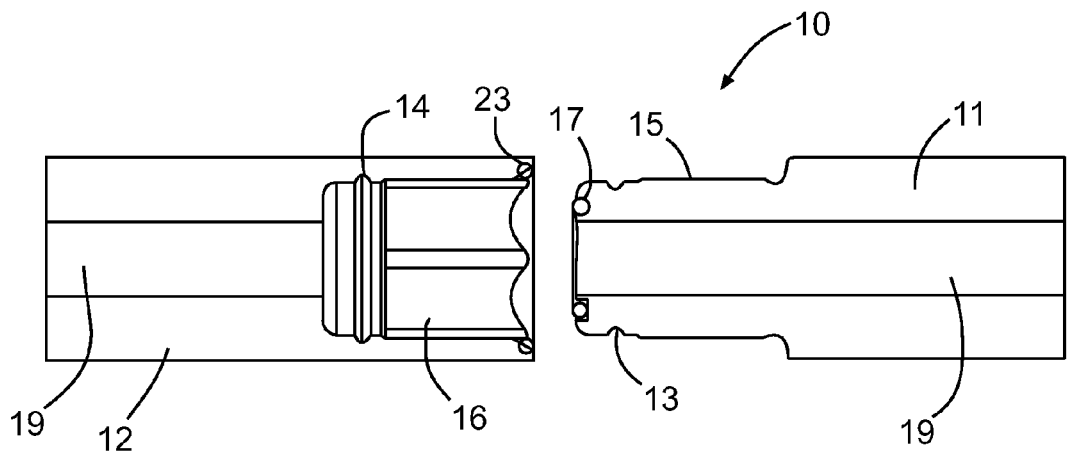
FIG. 3 is a front view sectioned through the axis of the preferred embodiment of the shear mechanism in a shear coupling. Wire not shown; removed for clarity. The shear mechanism is isolated from torsion.

The shear couplings disclosed here may be used in well strings used downhole. The shear coupling male and female components mate with each other at respective mating ends and have opposed ends that connect into the well string. In FIGS. 1-3, a shear coupling 10 comprises a male component 11 mated with a female component 12. The male component 11 and female component 12 have cooperating receiving parts 13, 14 that together define a receiving space, in the embodiment shown the receiving parts are half-grooves 13, 14 which together form a groove. A breakable part 21 is located in the receiving space. The breakable part 21 contacts against each of the male component 11 and the female component 12 to convey axial forces between the male component 11 and the female component 12 below a first axial load. The first axial load defines an upper boundary for a first operating range in which the shear coupling 10 is intended to convey axial, torsional and bending loads. The operating range is defined for the intended application. The breakable part 21 is breakable under axial loads within a second operating range of axial loads below the axial load break points of the male component 11 and female component 12 and above the first axial load. The second operating range corresponds to a pre-set operating range for breaking the shear coupling 10. In an embodiment disclosed here, the receiving space comprises a groove, and the breakable part 21 comprises a wire. Instead of a wire, other elements may be used such as ball bearings, rollers, pins, snap rings, E-clips and segments of a wire. The receiving space may be continuous or discontinuous. The shear coupling may be used as disclosed. Male component 11 has a bore or thru hole along the central axis allowing for fluid flow within the coupling. Female component 12 also has a bore or through hole along the central axis. Elements 15 and 16 are a key and keyway respectively and transmit torque applied to the shear coupling 10. The key and keyway portions of the male components and female components shown in the figures are parts that bear against each other in use to transmit torque. Seal 17 ensures fluid flow through the shear coupling 10. In FIG. 2, opening 18 is an installation hole which the breakable part 21 may be fed into. The installation hole intersects the groove formed by half-grooves 13 and 14. When a wire is used for the breakable part 21, the wire wraps around the diameter of the shear coupling as it is fed into the groove. In FIGS. 1, 2 and 3, element 19 is the flow through area which allows fluid to flow through the shear coupling 10 rather than outside the shear coupling. In FIGS. 1 and 3, O-ring 23 between the male component 11 and female component 12 isolates the key 15 and keyway 16 from fluids in the wellbore.

Figure 4:
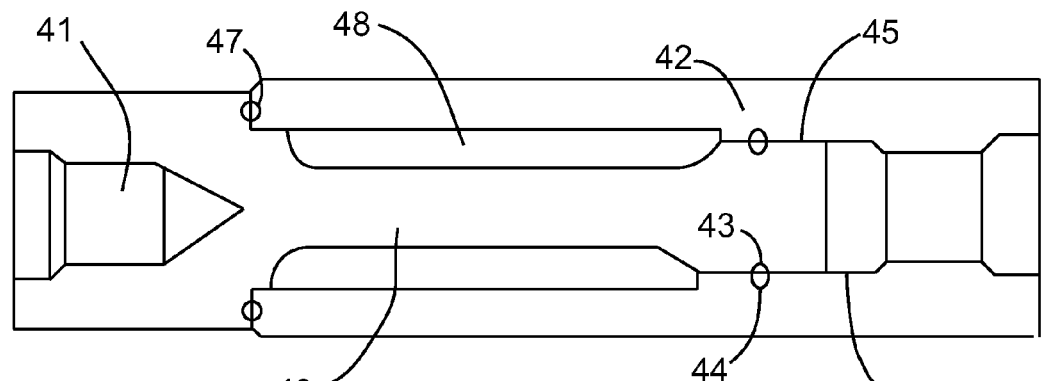
FIG. 4 is a front view sectioned through the axis of an alternative embodiment of the shear mechanism in a shear coupling in which the shear mechanism is isolated from bending and torsional loads.
Figure 5:
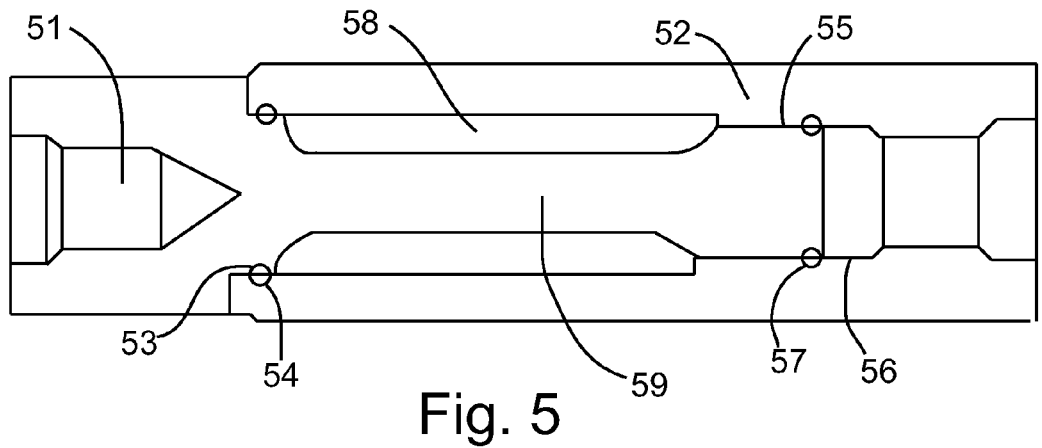
FIG. 5 is a front view sectioned through the axis of a secondary alternative embodiment of the shear mechanism in a shear coupling in which the shear mechanism is isolated from bending and torsional loads.
Figure 6:
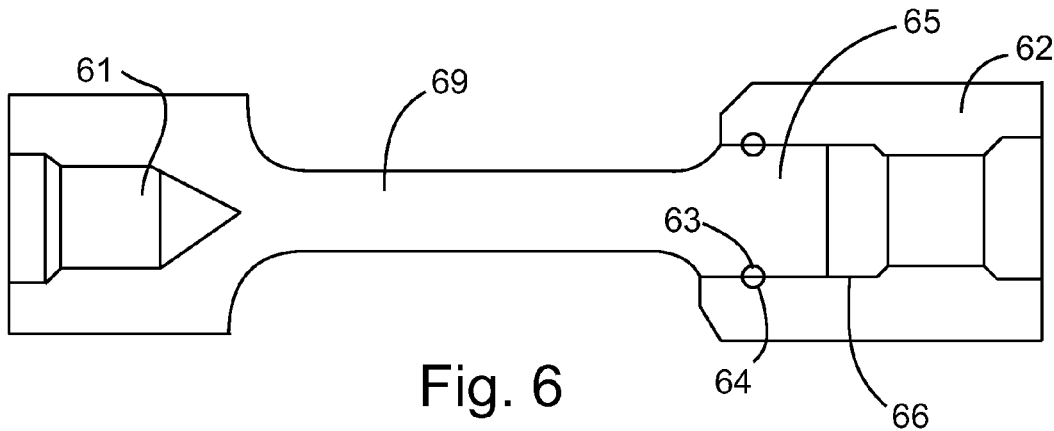
FIG. 6 is a front view sectioned through the axis of a tertiary alternative embodiment of the shear mechanism in a shear coupling in which the shear mechanism is isolated from torsional loads and is similar to the secondary embodiment but lacking the tube which resists bending loads.

There are many variations and applications for the present invention and all are not shown in the included figures. One of the possible variations is to omit the flow through area 19 in FIGS. 1, 2 and 3. In this variation the fluid would flow outside the shear coupling as is the industry norm as shown in FIGS. 4, 5 and 6. FIG. 4 and FIG. 5 show the shear mechanism isolated from both bending and torsion by a tubular portion 48, 58 of the female component 42, 52 respectively. FIG. 4 shows solid male component 41, female component 42, receiving parts 43, 44, key and keyway 45, 46 in which the breakable part is near the end of the male component 41. FIG. 5 shows solid male component 51, female component 52, receiving parts 53, 54, key and keyway 55, 56 in which the breakable part is near the end of the female component 52. FIG. 6 shows a variation of FIGS. 4 and 5 without the tube which resists bending. FIG. 6 shows solid male component 61, female component 62, receiving parts 63, 64, key and keyway 65, 66 in which the breakable part is near the end of the male component 61. An alternate possible application of the present invention is the shear mechanism in a tubing drain where the screw screws are replaced with the shear wire (not shown). Variations on the breakable part 21 as used in the device of FIGS. 1-3 may also be used in the devices of FIGS. 4-6. In FIGS. 4 and 5, O-ring 47 and O-ring 57 respectively between the male and female components of those figures isolates the respective key and keyways from fluids in the wellbore. In FIGS. 4 and 5, the torque/bending transmitting mechanism may be on the left or right side of the drawing.

If a wire is used for the breakable part 21, it may have any suitable cross-section such as round or flat, and when flat forms a strip that may be fed into the groove when the two components are mated together through a hole or slot which intersects the groove from outside the assembly and forms the shear mechanism and the shear load or shear pressure is controlled by varying the cross sectional area of the strip, ultimate strength and length of the strip fed into the groove.

Unlike known shear coupling designs, the shear mechanism according to this invention is only subject to axial loading within the shear coupling even though the shear coupling body is subject to axial, bending and torsional loading. In a preferred embodiment, a shear coupling comprises two components, one male and one female, with matching grooves on both components. A wire is fed into the groove when the components are mated together through a hole which intersects the groove from outside the shear coupling assembly and forms the shear mechanism and the shear load is controlled by varying the wire diameter, ultimate strength and length of the wire fed into the groove. A key and keyway transmits torque without applying the load to the wire which forms the shear mechanism. Similarly the key, keyway and shaft transmit the bending load without applying load to the shear mechanism. The wire may be isolated from downhole fluids using an o-ring, dual O-rings or similar seal 17 preventing corrosion and binding of the shear mechanism. The shear coupling 10 may be hollow and thus allow fluid to flow through the shear coupling; this is a feature that is not present in any known shear coupling designs and is beneficial to well sites in certain conditions.

The shear couplings of FIGS. 4-6 also incorporate a reduced diameter portion 49, 59 and 69, which comprises an annular recess in the examples shown, respectively of the male components 41, 51 and 61. The reduced diameter male components may also be incorporated in other shear couplings that use conventional radially extending pins such as shown in FIGS. 7-11.

Figure 7:
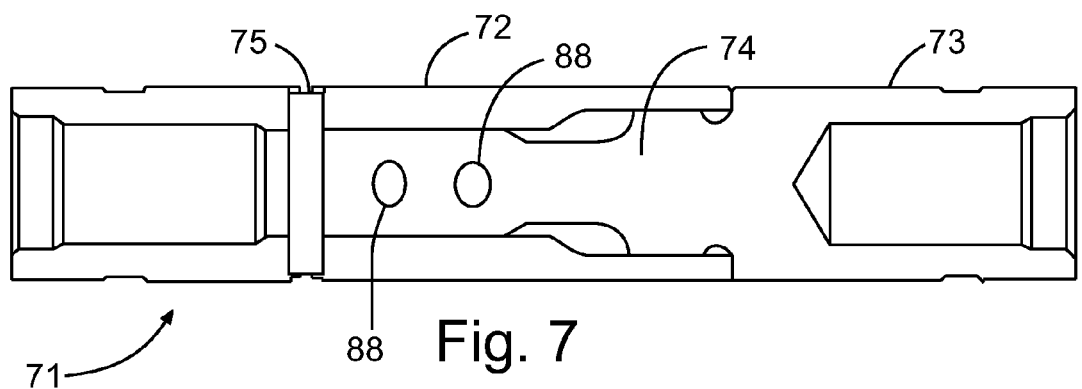
FIG. 7 is a cross-sectional view of the preferred embodiment of a further shear coupling in assembly.

Referring to FIG. 7, a shear coupling 71 comprises a first component 72 and second component 73 mated by a hexagonal key 74 and multiple shear pins 75.

Figure 8:
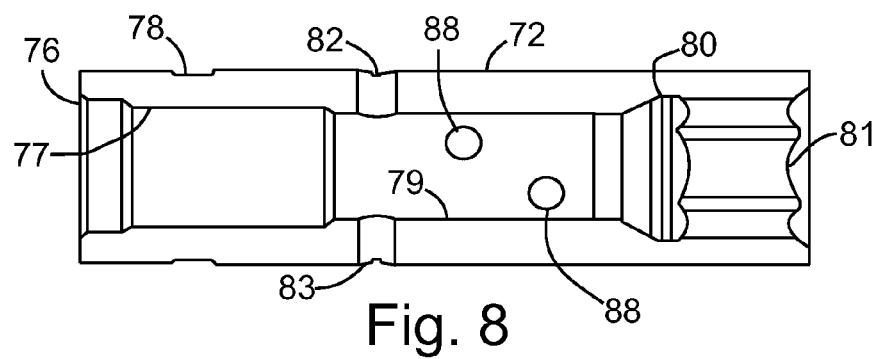
FIG. 8 is a cross-sectional view of the first component (hub) of the shear coupling assembly of FIG. 7.
Figure 8A:
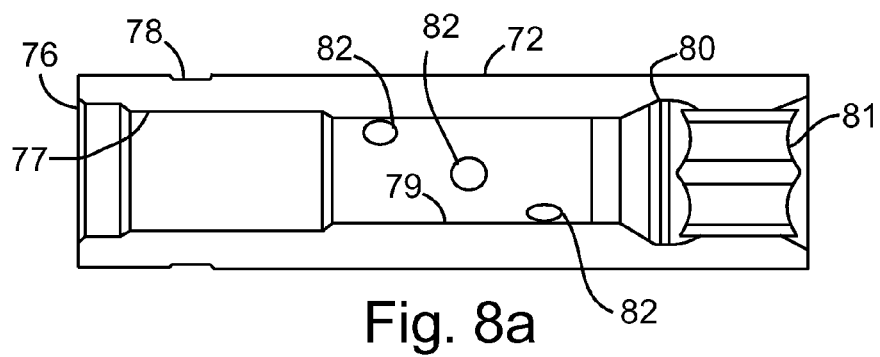
FIG. 8A is a detail of a portion of FIG. 8 showing an increased diameter of the female component adjacent the keyway.

Referring to FIG. 8, the first end 77 of the first component 72 has an internal sucker rod box thread 77 for connecting the shear coupling to a rod string (not shown). A stamping groove 78 is located on the outside diameter of the first component 72 for stamping information such as a work order number, which may be used to ensure material traceability. An axial thru hole or bore is denoted by the numeral 79. A diametral recess 80 (increased internal diameter part) next to the hexagonal keyway 81 is used to isolate the shear pin holes 82 and 83 from bending and torsion.

Figure 9:
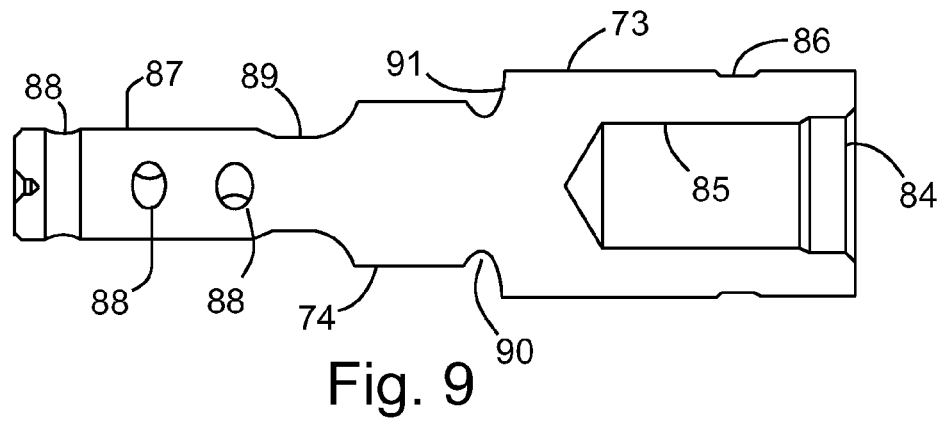
FIG. 9 is a cross-sectional view of the second component (shaft) of the shear coupling assembly of FIG. 7.

Referring to FIG. 9, the first end 84 of the second component 73 also has an internal sucker rod box thread 85 for connecting the shear coupling to a rod string (not shown). A stamping groove 86 is located on the outside diameter of the second component 73 for stamping information such as a work order number. The mandrel 87 of the second component 73 mates with the axial thru hole 79 of the first component 72, and the holes 88, 82, and 83 of the second component 73 and first component 72 are aligned so that shear pins 75 can be assembled concentrically in these holes 82, 83, and 88. A diametral relief 89 located on the mandrel 87 next to the hexagonal driver 74 is used to isolate the shear pins 75 from bending and torsion. Another diametral relief 90 is used to reduce stress in the second component 73 at the shoulder 81.

Figure 10:
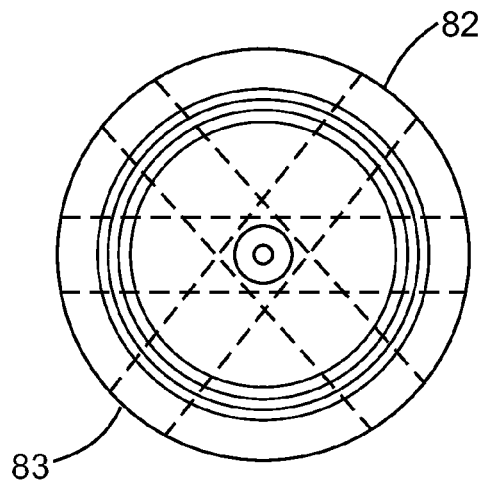
FIG. 10 is an end view of the shear coupling showing the orientation of transverse thru holes of FIG. 7.

Referring to FIG. 10, the shear pin holes 82 and 83 are staggered such that they are equally spaced around the axis of the shear coupling assembly 71, further helping to reduce the unequal plane bending and torsional forces on the shear pins 75.

Figure 11:
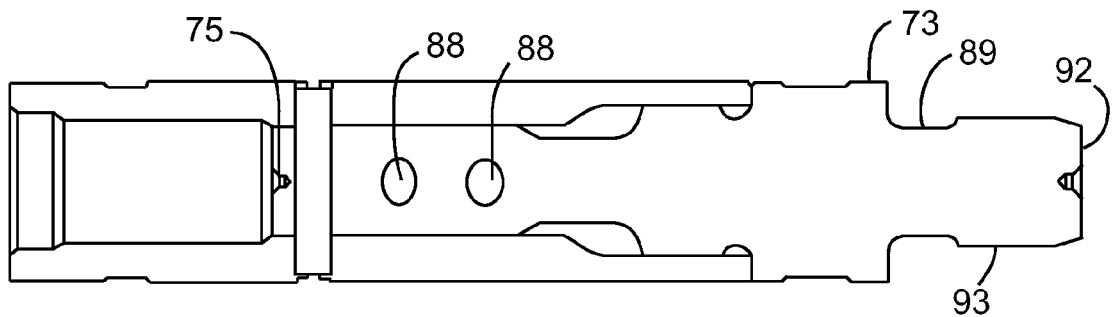
FIG. 11 is an alternative embodiment of the shear coupling of FIG. 7.

Referring to FIG. 11, an alternate embodiment of the present invention is shown where the first end 92 of the second component 73 has an external sucker rod pin thread 93 for connecting the shear coupling to a sucker rod coupling (not shown) which is further connected to the rod string.

The embodiments of FIGS. 4-11 minimize bending and torsional loading of the shearing parts, whether used with the shearing part of FIGS. 1-6 or of FIGS. 7-11 where a number of shear pins are inserted into holes drilled transversely through both components of the shear coupling.

The transverse holes are spaced evenly around the circumference of the shear coupling result in significantly more even stiffness for bending. The examples of FIGS. 7-11 may transfer torque between the male and female halves using a hexagonal drive key and keyway. Typical industry keys and keyways are square. The bearing area available for contact is increased as the numbers of sides in the keyway are increased for a given length. A small stress relief was added between the key and the shoulder of the male component to improve fatigue life. In addition, a diametral recess on the male component works in conjunction with a complementary diametral recess on the female component in order to isolate the shear pins from bending and torsion.

Figure 12A:
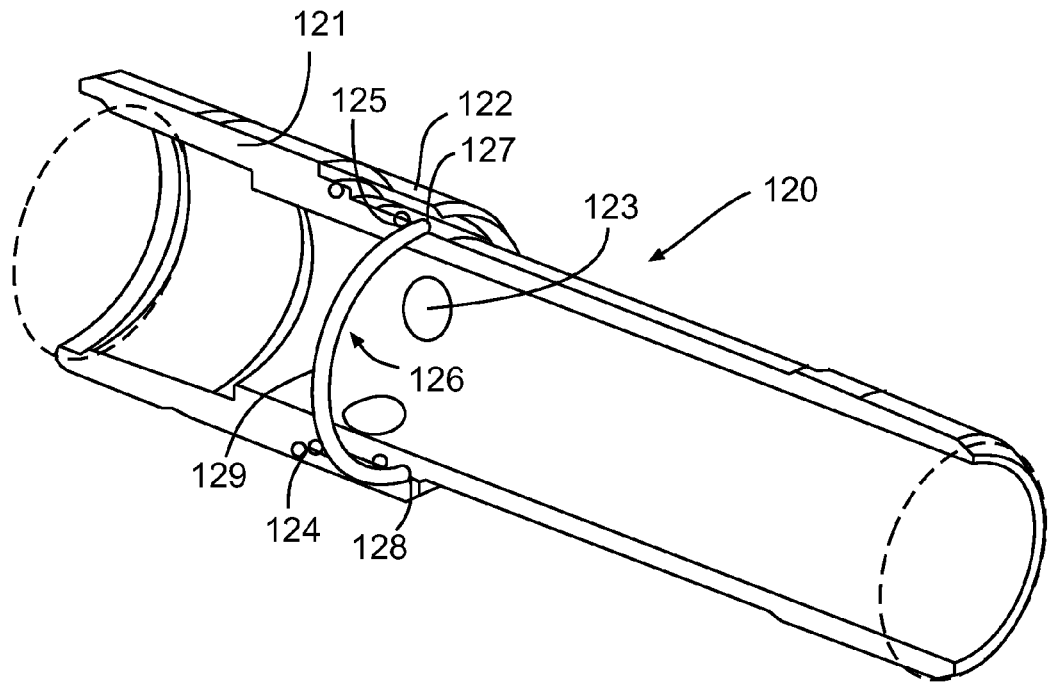
FIGS. 12A and 12B show an embodiment with a wire shear mechanism in a tubing drain.
Figure 12B:
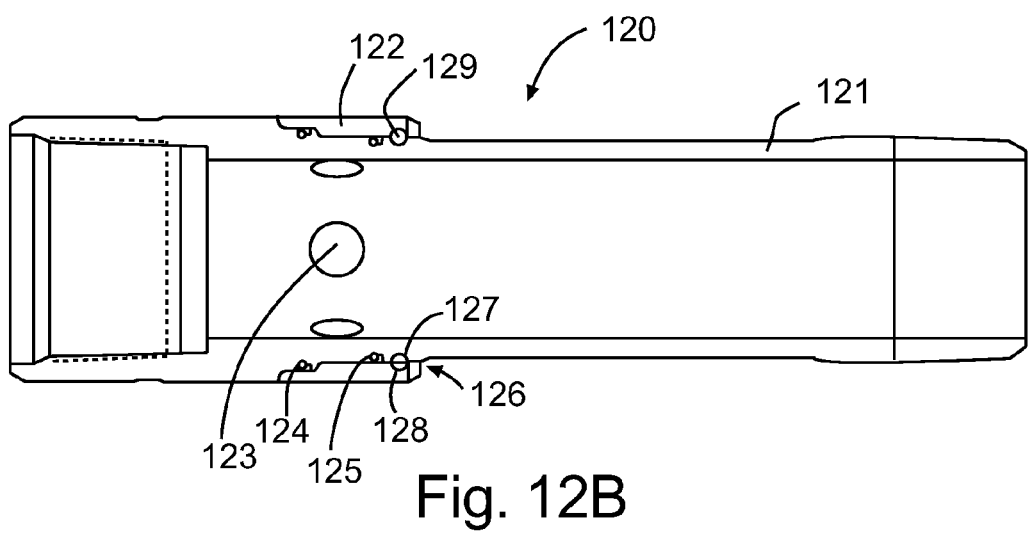

The wire shearing mechanism may also be incorporated in tubing drains, as illustrated for example in FIGS. 12A and 12B. Similar to a shear coupling a tubing drain 120 is comprised of two components, one male component 121 and one female component 122. The male component 121 is referred to as the tubing drain body and resembles a large diameter pipe which threads onto segment of tubing. A number of holes or slots 123 in the tubing drain body allow downhole fluids to flow in or out of the tubing body through the openings. The female component 122 is referred to as a sleeve and functions by sealing the openings in the body by sliding over top of openings with o-rings or similar seals 124, 125 on either side of the openings. The sleeve 122 is designed to slide down the body allowing the fluid to drain out when the inside pressure reaches a pre-determined amount and activates a shear mechanism 126 between the tubing drain body 121 and sleeve 122. All tubing drain designs known to the inventors use a shear mechanism comprising of multiple shear pins which thread through the sleeve into the body where the pre-determined shear pressure is controlled by varying the ultimate strength of the screws and the shear diameter of the screws. Tubing drains are activated prior to removing the tubing from the well and are necessary to avoid lifting the fluid weight and avoid fluid contamination of the surface at the well site. As with the shear couplings shown in FIGS. 1-11, matching grooves 127 and 128 are provided on both the male and female components 121, 122 of the tubing drain to form an annular receiving space or recess. A wire 129 (or other suitable element as disclosed in relation to the embodiments of FIGS. 1-11) is fed into the groove formed by grooves 127, 128 when the components 121, 122 are mated together through a hole (not shown), which intersects the groove 127, 128 from outside the tubing drain assembly and forms the shear mechanism. The shear pressure is controlled by varying the design of the breakable element, for example, wire diameter, ultimate strength and length of the wire fed into the groove. The benefits of incorporating the shearing mechanism into a tubing drain are that the length of the tubing drain can be reduced because the wire diameter is typically much smaller than the diameter of shear screws and the wall thickness of the body at the groove will be thicker. The increased wall thickness results in a greater strength of the tubing drain body and the decreased sleeve length allows for a larger gripping area for use with power tongs making the installation and removal of the tubing drain easier.

Immaterial modifications may be made to the embodiments described here without departing from what is claimed. In the claims, the word "comprising" is used in its inclusive sense and does not exclude other elements being present. The indefinite article "a" before a claim feature does not exclude more than one of the feature being present.

The embodiments of the invention in which an exclusive property or privilege is claimed are defined as follows:

1. A shear coupling, comprising:
   a male component mated with a female component;
   the male component and female component having cooperating receiving parts that together define one or more receiving spaces;

one or more breakable parts located in the one or more receiving spaces, the one or more breakable parts contacting against each of the male component and the female component to convey axial forces between the male component and the female component below a first axial load, the one or more breakable parts being breakable under axial loads within an operating range of axial loads below the axial load break points of the male component and female component and above the first axial load, and the operating range corresponding to a pre-set range for breaking the shear coupling;

the male component having a connecting end that connects to a part in a well string other than the female component and having a portion that bears against the female component to transmit torque to the female component; and the male component having a reduced diameter part between the one or more receiving spaces and the portion that bears against the female component to transmit torque to the female component, the reduced diameter part being arranged to cooperate with the one or more breakable parts to provide bending and torsional stress relief on the one or more breakable parts in operation of the shear coupling.

2. The shear coupling of claim 1 in which the male component is keyed to the female component.

3. The shear coupling of claim 2 in which the male component is keyed to the female component with a hexagonal key.

4. The shear coupling of claim 1 further comprising an opening in one or both of the male component and the female component that is aligned with the receiving space.

5. A shearing mechanism for securing two components which shears at a pre-determined axial load, the shearing mechanism comprising:

(a) a male component that mates into a female component, the male component and the female component having one or more cooperating receiving spaces;

(b) one or more breakable parts within the one or more cooperating receiving spaces, the one or more breakable parts having a shear load that is controlled by the material and size of the one or more breakable parts;

(c) the male component having a connecting end that connects to a part in a well string other than the female component and having a portion that bears against the female component to transmit torque to the female component; and (d) the male component having a reduced diameter part between the one or more cooperating receiving spaces and the portion that bears against the female component to transmit torque to the female component, the reduced diameter part being arranged to cooperate with the one or more breakable parts to provide bending and torsional stress relief on the one or more breakable parts in operation of the shearing mechanism.

6. The shearing mechanism of claim 5 in which the male component is keyed to the female component.

7. The shearing mechanism of claim 6 in which the male component is keyed to the female component with a hexagonal key.

* * * * *